United States Patent [19]

Kachadurian

[11] Patent Number: 5,539,376
[45] Date of Patent: Jul. 23, 1996

[54] ANTI-TAMPER SHIELD FOR AUTO ALARM

[76] Inventor: Edward Kachadurian, 10635 Chancelor Dr., Brighton, Mich. 48116

[21] Appl. No.: 104,726

[22] Filed: Aug. 11, 1993

[51] Int. Cl.$^6$ ..................................... B60Q 1/00
[52] U.S. Cl. ...................... 340/425.5; 340/426; 180/287; 307/10.3
[58] Field of Search ................................ 340/425.5, 426, 340/542, 568; 180/287, 69.1, 69.25; 307/10.3; 280/159, 847

[56] References Cited

U.S. PATENT DOCUMENTS

| | | | |
|---|---|---|---|
| 2,732,024 | 1/1956 | Schonwald | 180/69.1 |
| 3,316,995 | 5/1967 | Fay | 180/69.1 |
| 3,651,884 | 3/1972 | Dorries | 180/69.1 |
| 3,815,702 | 6/1974 | Paananen | 180/69.1 |
| 3,863,212 | 1/1975 | Nyc | 340/426 |
| 3,914,738 | 10/1975 | Hager | 340/426 |
| 4,114,717 | 9/1978 | Andrews | 180/69.1 |
| 4,445,584 | 5/1984 | Kimura et al. | 180/69.1 |
| 4,655,307 | 4/1987 | Lamoureux | 180/69.1 |
| 4,875,537 | 10/1989 | Garnatz et al. | 180/69.1 |
| 4,936,418 | 6/1990 | Clausen | 180/69.1 |

OTHER PUBLICATIONS

"Parts & Accessories" pp. 23, 59, 211, catalog No. 555J Nov. 1993.

Primary Examiner—Brent A. Swarthout
Assistant Examiner—Nina Tong
Attorney, Agent, or Firm—John R. Benefiel

[57] ABSTRACT

An anti-tamper shielding panel is held in position over an opening beneath an auto alarm installed in an auto engine compartment by a series of tension cables anchored at points within the engine compartment. The alarm is protected from efforts to disable the alarm by preventing reaching up through the opening.

6 Claims, 1 Drawing Sheet

ANTI-TAMPER SHIELD FOR AUTO ALARM

BACKGROUND OF THE INVENTION

This invention concerns alarms for automobiles, and more particularly such alarms which are installed under the hood in the engine compartment. The engine compartment, while covered by the hood is open from the bottom, and spaces between the engine compartment walls and the various engine and other parts often form clearance openings allowing access from the underside which render the alarm vulnerable to tampering. The alarm may thus be easily disabled, as by tearing the wire leads loose by reaching up from underneath the engine compartment and through the openings.

The object of the present invention is to protect under the hood mounted auto alarms from such disabling tactics.

SUMMARY OF THE INVENTION

The present invention comprises one or more shielding accessory or add-on panels configured and positioned to obstruct any clearance openings accessible from the underside of the engine compartment adjacent the auto alarm. The shielding panel is fixed in position by a mounting arrangement which cannot be disassembled from below so that the shield panel is resistant to efforts to remove it, thereby effectively deterring such attempts to disable the alarm.

The mounting arrangement consists of abutting the shielding panel against the undersurface of adjacent fixed structure within the engine compartment defining the opening to be blocked, and securing the same preferably with a plurality of tension cables, each attached at one end to the shielding panel and anchored at the other end at various fixed points within the engine compartment. Turnbuckles may be included to assist in tightening the cables to insure that the shielding panel is held tightly.

The attachment of the cables to the shielding panel is by means which cannot be loosened from below, such as by smooth headed carriage bolts passing upwardly through holes in the shielding panel which leave only the smooth round heads accessible from below the shielding panel to resist efforts at their removal.

The shielding panel is preferably of a tough, flame and corrosion resistant material such as ¼ inch polycarbonate plastic, although other strong materials such steel can also be used.

DETAILED DESCRIPTION

In the following detailed description, certain specific terminology will be employed for the sake of clarity and a particular embodiment described in accordance with the requirements of 35 USC 112, but the invention is not so limited as it may take many forms and variations within the scope of the appended claims.

Figure 1:
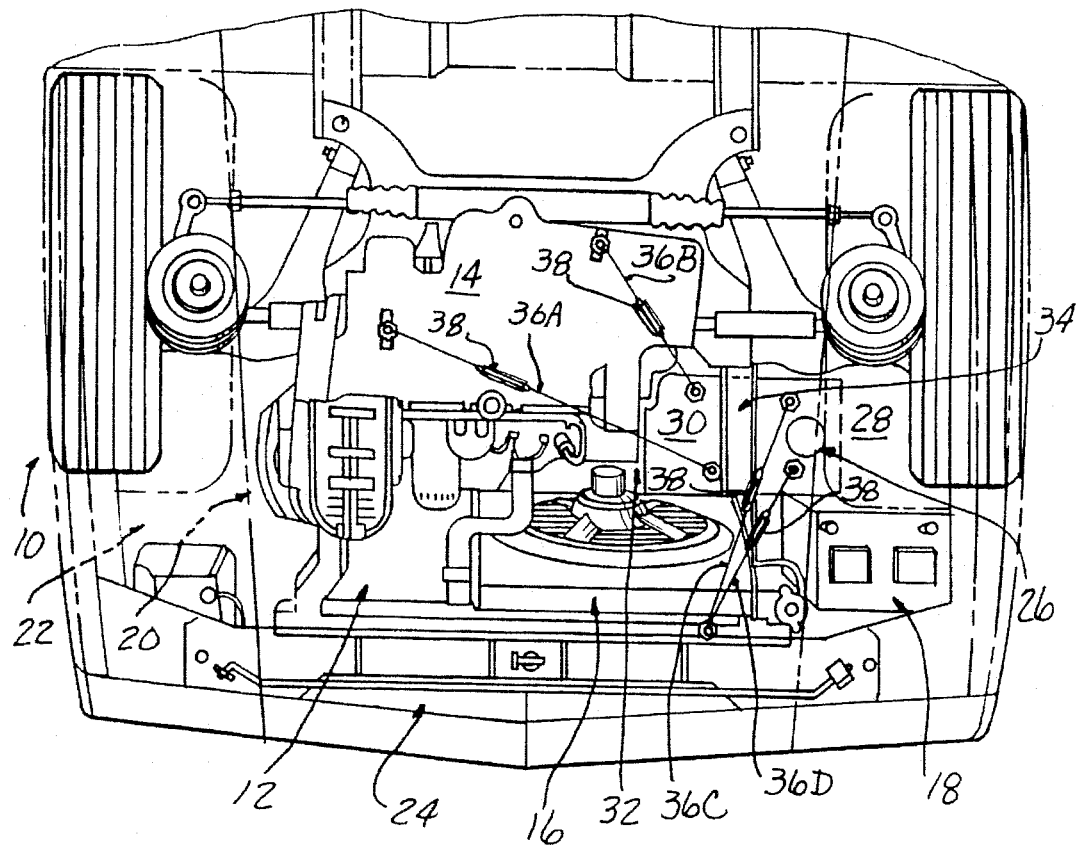
FIG. 1 is a plan view of the engine compartment of an automobile with a shielding panel according to the present invention installed to protect an alarm also installed within the engine compartment.
Figure 2:
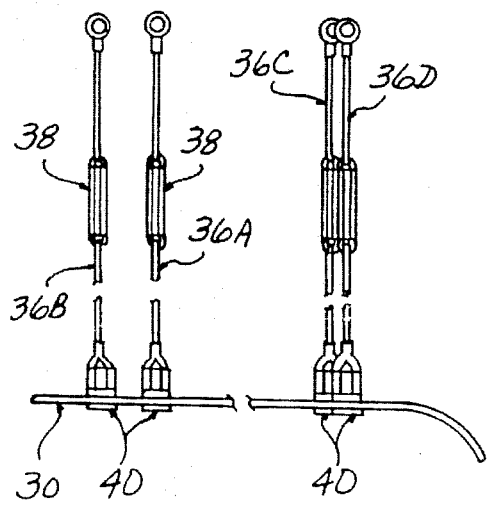
FIG. 2 is a front elevational view of the shielding panel depicted in FIG. 1 and the attached cables.
Figure 3:
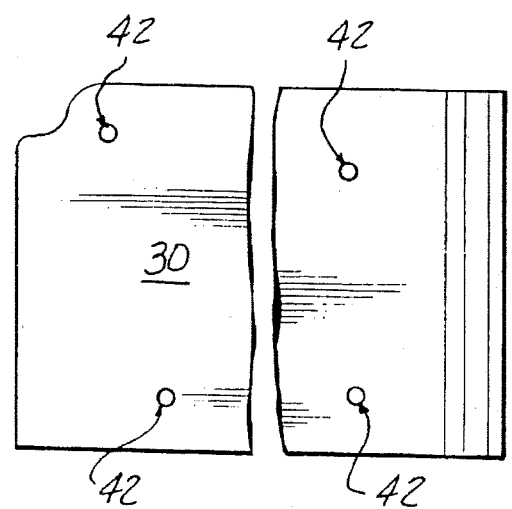
FIG. 3 is a fragmentary plan view of the shielding panel shown in FIG. 2.

Referring to the drawings, FIG. 1 shows an automobile 10 with an engine compartment 12, which typically houses an engine transaxle drive 14, radiator 16, battery 18, and numerous other functional components included as a part of the various auto systems.

The engine compartment 12 is overlain by the hood 20 shown in phantom and enclosed by the fenders 22 and guill 24 to be inaccessible from above with the hood 20 down and latched.

An auto alarm 26 is installed within the engine compartment, as to the inner fender 28.

According to the present invention, a shielding panel 30 is installed to substantially completely cover a clearance opening 32 formed between the engine compartment walls and under the hood components or between the various components themselves, which opening 32 is aligned below the alarm 26. The shielding panel 30 extends across and beneath a fixed engine support member 34 and the inner fender 28 and is held there by a series of tension cables 36A–36D pulling upwardly on the shielding panel 30.

The tension cables 36A–36D are each attached at one end to the shielding panel 30 and anchored at their other ends at various fixed points within the engine compartment, i.e. to lifting eyes on the engine transaxle 14, and to radiator mounting sheet metal.

The tension cables 36A–36D are preferably able to be tensioned by turnbuckles 38.

Attachment of the tension cables 36A–36D to the shielding panel 30 is by smooth headed fastener elements 40 passing upwardly through holes 42. Thus, the shielding panel cannot be disassembled from below.

If a metal shielding panel is employed, the cables could be attached to fittings welded to upper face of the panel to also defeat disassembly from below.

The configuration of the shielding panel 30 will differ for each automobile model, shaped so as to fit over and block substantially completely the opening sought to be covered and to extend so as to abut beneath the adjacent fixed structure. Similarly, the number and location of the tension cables are selected to insure tight, secure upward holding of the shielding panel 30 against the abutting structure.

If necessary, more than one shielding panel can be installed to substantially completely cover all openings within reach of the alarm 26.

Thus, the alarm 26 is completely protected against efforts to disable the same by reaching up through openings between the various structure and components located within the engine compartment.

I claim:

1. A method of protecting an auto alarm located within the engine compartment of an automobile, above a clearance opening allowing access to the alarm from below comprising the steps of installing a shielding panel configured to substantially block said clearance opening from below, said step of installing said shielding panel including the step of fixedly holding said shielding panel in a blocking position substantially covering said clearance opening so as to not be able to be removed from below, whereby access to said alarm through said clearance opening is prevented.

2. The method of claim 1 wherein said step of installing said shielding panel comprises the steps of attaching one end of each of a series of tension cables to hold said shielding panel to upwardly abut against fixed structure adjacent said opening and anchoring the other end of each of said tension cables to fixed points within said engine compartments.

3. An anti-tamper arrangement for protecting an alarm installed within an engine compartment of an automobile comprising at least one shielding panel extending to block a clearance opening extending into said engine compartment between engine compartment mounted components, said clearance opening located below said alarm to normally enable access to said alarm, holding means holding said shielding panel against structure in said engine compartment adjacent said opening, said holding means including elements located above said shielding panel and configured so as to be inaccessible from below said shielding panel in order to prevent removal of said shielding panel.

4. The arrangement according to claim 3 wherein said holding means elements comprise a series of tension cables each attached at one end to said shielding panel and extending upwardly from said shielding panel into said engine compartment, said tension cables each anchored at another end to an anchor point within said engine compartment.

5. The arrangement according to claim 4 wherein said shielding panel is of polycarbonate plastic.

6. The arrangement according to claim 4 wherein said tension cables are attached to said shielding panel by pins each having an elongate body extending upwardly through holes in said shielding panel, said pins having heads abutting the under surface of said shielding panel, and said cables attached to a respective pin body at a point above said shielding panel.

\* \* \* \* \*